(12) United States Patent
Nishiyama

(10) Patent No.: US 11,156,451 B2
(45) Date of Patent: Oct. 26, 2021

(54) THREE-DIMENSIONAL MEASUREMENT DEVICE, THREE-DIMENSIONAL MEASUREMENT METHOD, AND PROGRAM

(71) Applicant: Sony Interactive Entertainment Inc., Tokyo (JP)

(72) Inventor: Akira Nishiyama, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 16/880,369

(22) Filed: May 21, 2020

(65) Prior Publication Data

US 2020/0386537 A1     Dec. 10, 2020

(30) Foreign Application Priority Data

Jun. 5, 2019  (JP) .............................. JP2019-105178

(51) Int. Cl.
*G01B 11/00*     (2006.01)
*G01B 11/14*     (2006.01)
(Continued)

(52) U.S. Cl.
CPC .......... *G01B 11/005* (2013.01); *G01B 11/002* (2013.01); *G01B 11/14* (2013.01);
(Continued)

(58) Field of Classification Search
CPC . G06T 2207/10016; G06T 2207/10021; G06T 2207/10024; G06T 2207/10028; G06T 7/50; G06T 7/55; G06T 7/557; G06T 7/564; G06T 7/593; G06T 7/596; G06T 7/70; G06T 7/73; G06T 7/74; G06T 7/80; G06T 7/97; G02B 27/0093; G01B 11/002; G01B 11/005; G01B 11/026; G01B 11/03;
(Continued)

(56) References Cited

U.S. PATENT DOCUMENTS 8,989,518 B2 * 3/2015 Aratani ................ G06K 9/3216
                                                  382/291
9,607,219 B2 * 3/2017 Greveson ................ G06K 9/52
(Continued)

FOREIGN PATENT DOCUMENTS

JP     2017-053739 A    3/2017
WO  WO-2020013077 A1 * 1/2020 ............... G06T 7/00

*Primary Examiner* — Gordon J Stock, Jr.
(74) *Attorney, Agent, or Firm* — Katten Muchin Rosenman LLP

(57) ABSTRACT

There is provided a three-dimensional measurement device which includes an image selection unit that selects plural images in which the marker is detected, from among images captured by the plural cameras placed at different positions in a three-dimensional space where the marker exists, a marker position identification unit that identifies positional information regarding the marker in the three-dimensional space with use of the plural images, and an image reselection unit that reselects some of the plural images, on the basis of relationships between the positional information identified by the marker position identification unit and positional information regarding the plural cameras, and in which the marker position identification unit reidentifies the positional information with use of the reselected images.

11 Claims, 12 Drawing Sheets

(51) Int. Cl.
  *G01B 11/245* (2006.01)
  *G06T 7/73* (2017.01)
  *G06T 7/55* (2017.01)
  *G06T 7/00* (2017.01)

(52) U.S. Cl.
  CPC .............. *G01B 11/245* (2013.01); *G06T 7/55* (2017.01); *G06T 7/73* (2017.01); *G06T 7/74* (2017.01); *G06T 7/97* (2017.01); *G06T 2207/30204* (2013.01)

(58) Field of Classification Search
  CPC ......... G01B 11/14; G01B 11/22; G01B 11/24; G01B 11/2408; G01B 11/2416; G01B 11/245; G01B 11/25; G01B 11/2504
  See application file for complete search history.

(56) References Cited

U.S. PATENT DOCUMENTS

| | | | | |
|---|---|---|---|---|
| 9,892,516 | B2* | 2/2018 | Moteki | G06T 7/579 |
| 10,147,192 | B2* | 12/2018 | Moteki | G06T 7/593 |
| 10,825,198 | B2* | 11/2020 | Bae | G06T 7/55 |
| 2020/0258257 | A1* | 8/2020 | Shimoyama | G01B 11/00 |
| 2020/0302688 | A1* | 9/2020 | Hosfield | G02B 27/0172 |
| 2020/0349378 | A1* | 11/2020 | Raghoebardajal | G06K 9/00671 |

* cited by examiner

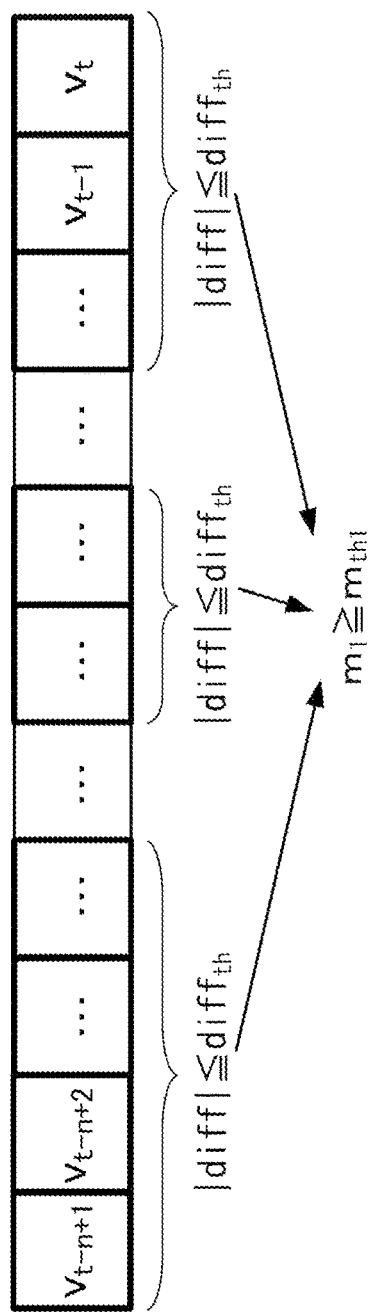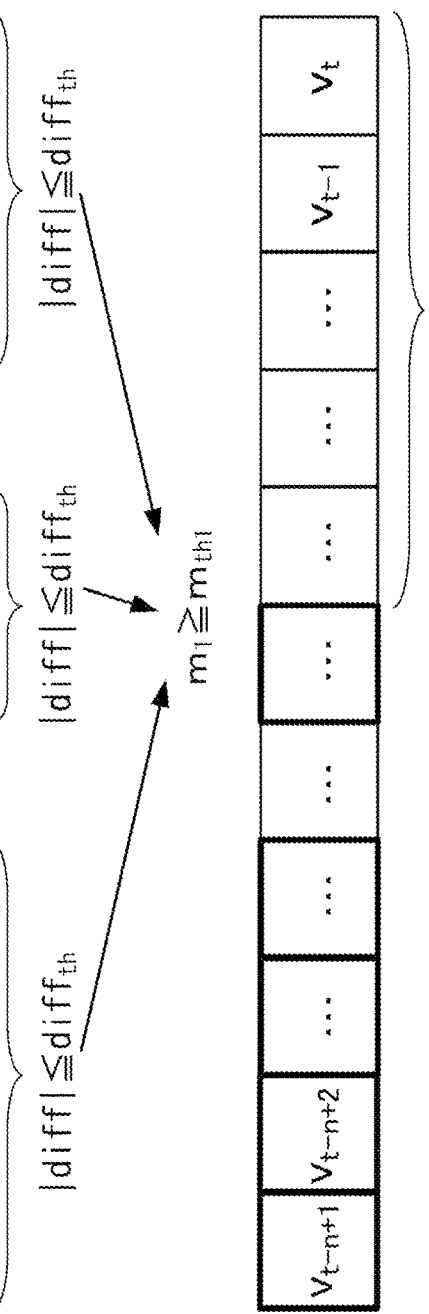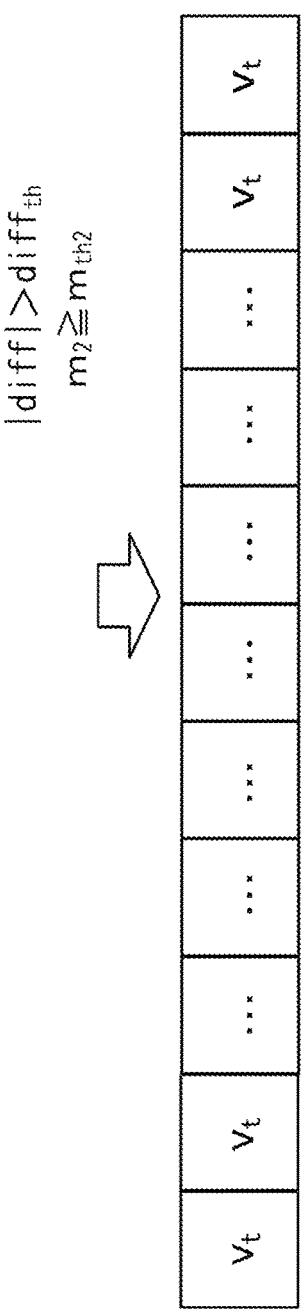
F I G. 9A   F I G. 9B   F I G. 9C

THREE-DIMENSIONAL MEASUREMENT DEVICE, THREE-DIMENSIONAL MEASUREMENT METHOD, AND PROGRAM

CROSS REFERENCE TO RELATED APPLICATIONS

This application claims the benefit of Japanese Priority Patent Application JP 2019-105178 filed Jun. 5, 2019, the entire contents of which are incorporated herein by reference.

BACKGROUND

The present disclosure relates to a three-dimensional measurement device, a three-dimensional measurement method, and a program.

Techniques of three-dimensional measurement with use of markers have been known. For instance, Japanese Patent Laid-open No. 2017-053739 discloses a technique for imaging an object fitted with a marker, with use of plural cameras placed in positions differing in angle and acquiring three-dimensional time-series positional information regarding the marker by measuring motions of the marker upon a principle of triangulation.

SUMMARY

In such three-dimensional measurement as described above, accuracy in the measurement is improved by use of images captured by a large number of cameras from different positions. Among images in which a marker is detected, however, additional use of images captured by a camera whose distance from the marker is within an appropriate range may improve the accuracy in the measurement, for instance, whereas additional use of images captured a camera whose distance from the marker is inappropriate, for instance, too far, may make no contribution to improvement in the accuracy in the measurement.

Therefore, it is desirable to provide a three-dimensional measurement device, a three-dimensional measurement method, and a program by which the accuracy in the three-dimensional measurement with use of a marker and plural cameras may effectively be improved by appropriate selection of images to be used in the measurement.

According to an embodiment of the present disclosure, there is provided a three-dimensional measurement device including an image selection unit that selects plural images in which a marker is detected, from among images captured by plural cameras placed at different positions in a three-dimensional space where the marker exists, a marker position identification unit that identifies positional information regarding the marker in the three-dimensional space with use of the plural images, and an image reselection unit that reselects some of the plural images, on the basis of relationships between the positional information identified by the marker position identification unit and positional information regarding the plural cameras, in which device the marker position identification unit reidentifies the positional information with use of the reselected images.

According to another embodiment of the present disclosure, there is provided a three-dimensional measurement method including selecting plural images in which a marker is detected, from among images captured by plural cameras placed at different positions in a three-dimensional space where the marker exists, identifying positional information regarding the marker in the three-dimensional space with use of the plural images, reselecting some of the plural images, on the basis of relationships between the identified positional information and positional information regarding the plural cameras, and reidentifying the positional information with use of the reselected images.

According to yet another embodiment of the present disclosure, there is provided a program for a computer that includes, by an image selection unit, selecting plural images in which a marker is detected, from among images captured by plural cameras placed at different positions in a three-dimensional space where the marker exists, by a marker position identification unit, identifying positional information regarding the marker in the three-dimensional space with use of the plural images, by an image reselection unit, reselecting some of the plural images, on the basis of relationships between the identified positional information and positional information regarding the plural cameras, and by the marker position identification unit, reidentifying the positional information with use of the reselected images.

BRIEF DESCRIPTION OF DRAWINGS

FIGS. 9A-9C depict diagrams for description of an example of a buffer process in the first embodiment of the present disclosure;

DETAILED DESCRIPTION OF THE PREFERRED EMBODIMENT

Figure 1:
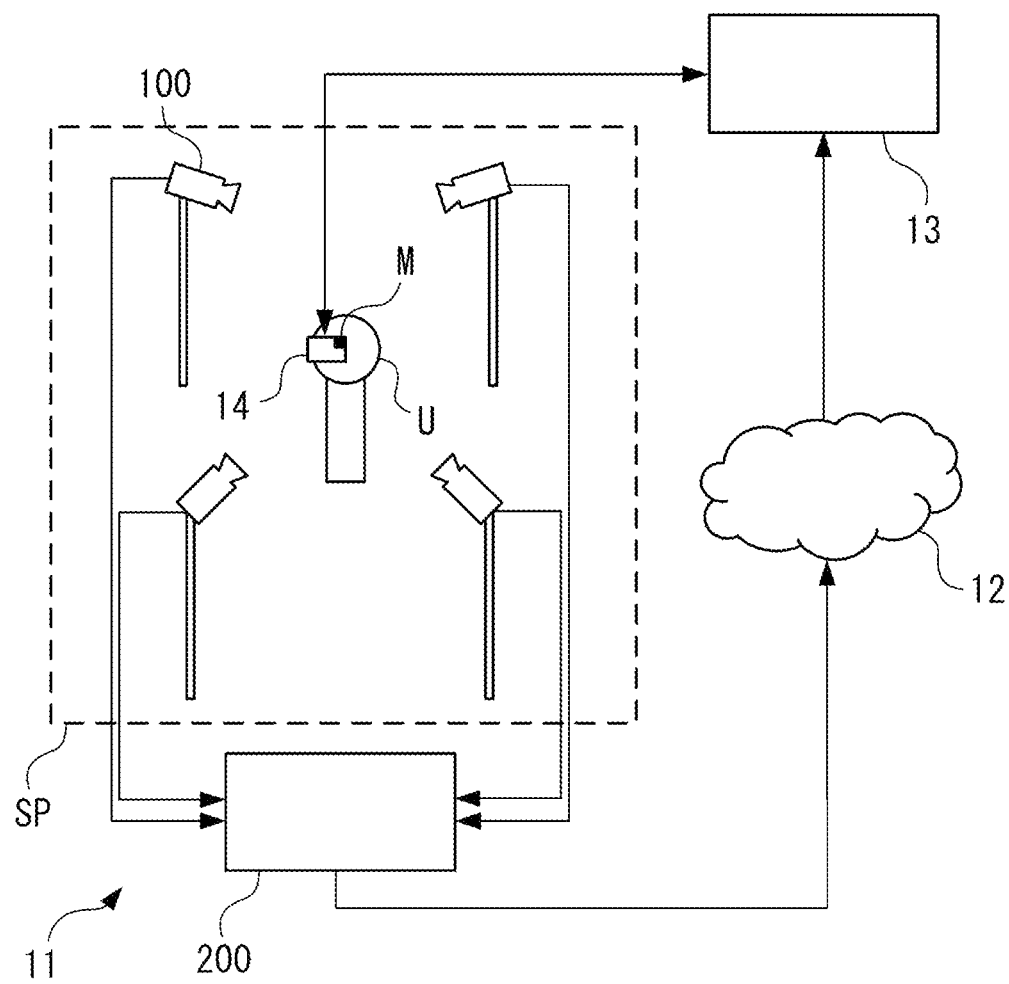
FIG. 1 is a diagram illustrating a schematic configuration of a system according to a first embodiment of the present disclosure.

Hereinbelow, several embodiments of the present disclosure will be described in detail with reference to the accompanying drawings. In the present specification and drawings, components having substantially the same functional configuration are provided with the same reference characters so that redundant description thereof may be omitted.

First Embodiment

FIG. 1 is a diagram illustrating a schematic configuration of a system according to a first embodiment of the present disclosure. In the illustrated example, a system 10 includes a three-dimensional measurement system 11 including plural cameras 100 and a three-dimensional measurement device 200, a server 12, a client 13, and a head-mounted display (HMD) 14. The plural cameras 100 capture images including a marker M attached to a user U who is a subject (object). More specifically, the plural cameras 100 are placed at different known positions in a three-dimensional space SP where the marker M exists and capture images of the three-dimensional space SP. The images captured by the plural cameras 100 are updated at specified time intervals (frames). The three-dimensional measurement device 200 identifies positional information, specifically, such as three-dimensional coordinates, regarding the marker M in the three-dimensional space SP upon a principle of triangulation with use of plural images in which the marker M is detected, among the images captured by the plural cameras 100.

In the illustrated example, the positional information regarding the marker M identified by the three-dimensional measurement device 200 is transmitted to the server 12. The server 12 processes the positional information in accordance with a specified procedure and transmits resultant information to the client 13. The client 13 further transmits the information to the HMD 14. The positional information regarding the marker M may be treated as positional information regarding the user U. Furthermore, plural markers M among which positional relationships are known may be attached to the user U, so that the three-dimensional measurement device 200, the server 12, the client 13, or the HMD 14 may estimate a position and a posture of the user U from the positional information regarding the markers M, for instance. Based on information regarding the position and the posture, a viewpoint for an image that is to be displayed in the HMD 14 and that represents a virtual space may be made to follow motions of the user U, for instance.

Figure 2:
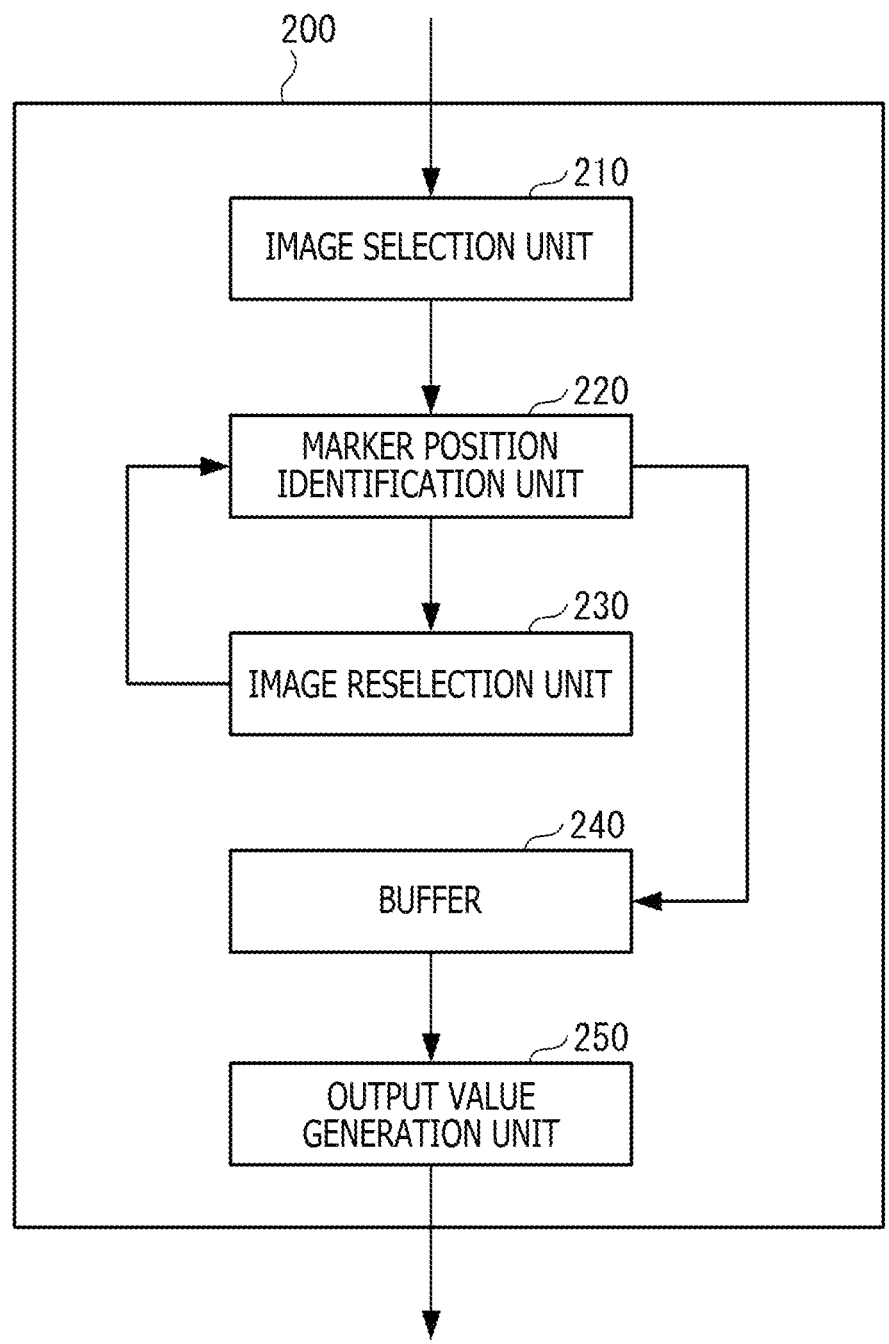
FIG. 2 is a block diagram illustrating a configuration of a three-dimensional measurement device in the system illustrated in FIG. 1.

FIG. 2 is a block diagram illustrating a configuration of the three-dimensional measurement device in the system illustrated in FIG. 1. In the illustrated example, the three-dimensional measurement device 200 includes an image selection unit 210, a marker position identification unit 220, an image reselection unit 230, a buffer 240, and an output value generation unit 250. The three-dimensional measurement device 200 is implemented by a computer including a communication interface, a processor, and a memory, and functions of the image selection unit 210, the marker position identification unit 220, the image reselection unit 230, and the output value generation unit 250 are fulfilled by operation of the processor in accordance with a program stored in the memory or received through the communication interface, for instance. The buffer 240 is implemented as a storage area on the memory. Hereinbelow, the functions of the units will further be described.

The image selection unit 210 selects plural images in which the marker M is detected, from among the images captured by the plural cameras 100 placed at the different positions in the three-dimensional space SP where the marker M exists, as illustrated in FIG. 1. Here, the marker M is detected by recognition of a specified shape or pattern in an image, for instance. The marker M may be detected easily and accurately in the image by formation of the marker M from a material that reflects light of a specified band (such as infrared) not included in a visible light range and configuration of the cameras 100 that enables detection of reflection of the light of the band. As will be described later, the image selection unit 210 may carry out an additional process for stabilizing output of the positional information in response to change of a number, combination, or the like of the images in which the marker M is detected.

The marker position identification unit 220 identifies the positional information regarding the marker M in the three-dimensional space SP with use of the plural images selected by the image selection unit 210. A method by which the marker position identification unit 220 identifies the positional information, specifically, such as three-dimensional coordinates, regarding the marker M upon the principle of triangulation is already known and thus detailed description of the method is omitted. As will be described later, the marker position identification unit 220 may reidentify the positional information regarding the marker M with use of images reselected by the image reselection unit 230. The image reselection unit 230 selects the images that make a contribution to improvement in accuracy of the positional information, according to positional relationships between the cameras that capture the images and the marker M, for instance, and thus the reidentified positional information is improved in accuracy in comparison with the positional information that has originally been identified.

The image reselection unit 230 makes a reselection from the plural images selected by the image selection unit 210, on the basis of relationships between the positional information regarding the marker M identified by the marker position identification unit 220 and the positional information regarding the plural cameras 100. Here, the positional information regarding the cameras 100 is defined by a coordinate system that is the same as that for the three-dimensional coordinates of the identified marker M, for instance, and is stored in advance as configuration information in the memory of the three-dimensional measurement device 200. A specific example of the reselection of the images by the image reselection unit 230 will be described later. The image reselection unit 230 may iterate the reselection of images until the relationships between the positional information regarding the marker M reidentified by the marker position identification unit 220 and the positional information regarding the plural cameras 100 satisfy a specified condition. It is to be noted that in a case where the plural images selected by the image selection unit 210 have already satisfied the abovementioned condition, the image reselection unit 230 may omit to make the reselection of images so that the positional information initially identified by the marker position identification unit 220 may be stored in the buffer 240 without being modified.

The buffer 240 is a buffer with a specified length in which the positional information regarding the marker M identified (or reidentified) by the marker position identification unit 220 is stored at specified time intervals and in chronological order. The output value generation unit 250 generates an output value of the positional information regarding the marker M, from the positional information stored in the buffer 240. As will be described later, the output value generation unit 250 may generate a smoothed output value with use of the positional information stored in the buffer 240.

(Example of Image Selection Process)

Figure 3:
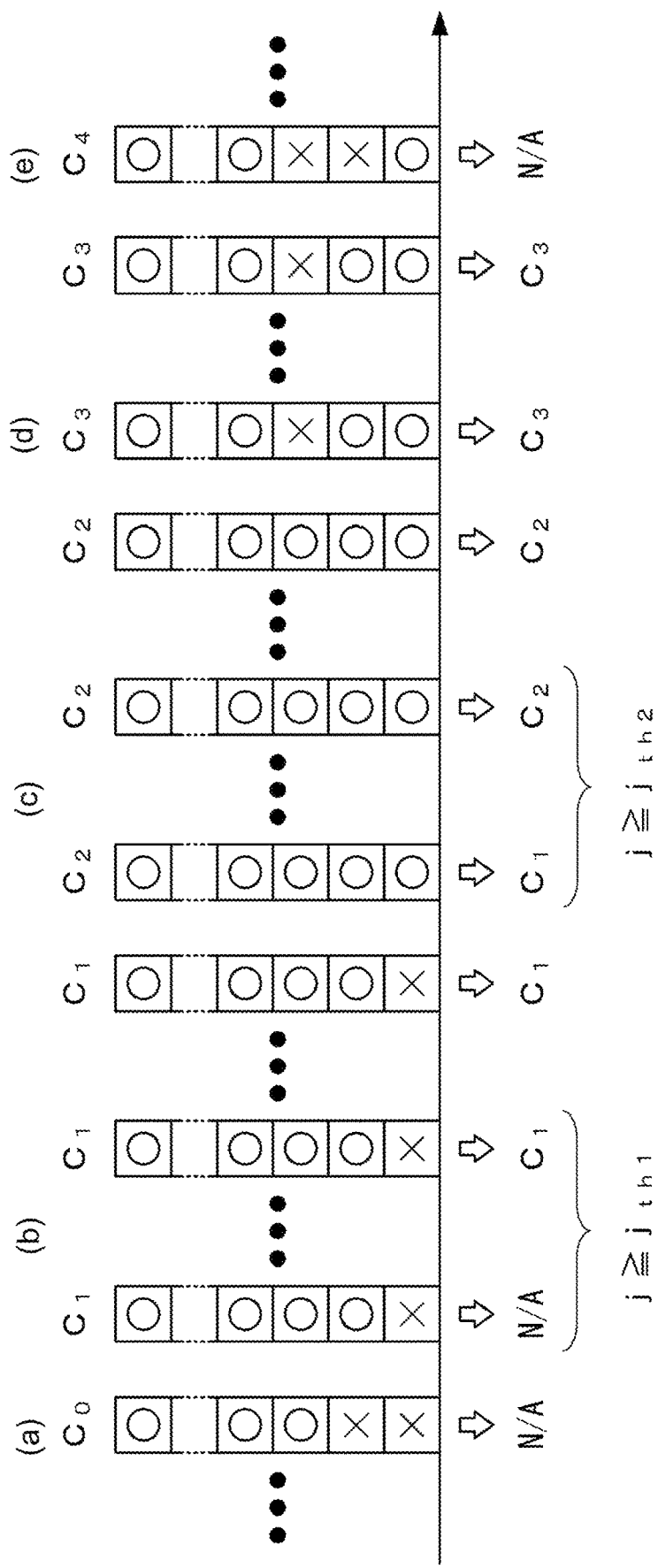
FIG. 3 is a diagram for description of an example of an image selection process in the first embodiment of the present disclosure.

FIG. 3 is a diagram for description of an example of an image selection process in the first embodiment of the present disclosure. In the present embodiment, the images captured by the plural cameras 100 are updated at the specified time intervals (frame rate), and the image selection unit 210 selects images in which the marker M is detected, for each frame, for instance. As described above, the image selection unit 210 may carry out the additional process for stabilizing the output of the identified positional information, as in an example to be described below, for instance, in response to the change of the number, the combination, or the like of the images in which the marker M is detected in each frame. In the illustrated example, an example of the image selection process that is carried out by the image selection unit 210 with sequential change in combinations $C_0$ through $C_4$ of the images in which the marker M is detected is illustrated.

In a case of the combination $C_0$ (number i of the images in which the marker M is detected<threshold $i_{th}$) ((a) of FIG. 3), the image selection unit 210 does not select the images (N/A), and the marker position identification unit 220 does not perform identification of the positional information regarding the marker M. By such omission of the identification of the positional information regarding the marker M in a case where the number i of the images in which the marker M is detected is smaller than the specified threshold $i_{th}$, the identification of unstable positional information based on an insufficient number of the images may be prevented, and the identification of the positional information regarding the marker M may be made in a limited case where sufficient accuracy is obtained, for instance.

It is to be noted that in the system 10 illustrated in FIG. 1, the position and the posture of the user U are identified in real time with high accuracy through integration of the position and the posture of the user U that are calculated from detection results of acceleration, angular velocity, and the like from an inertial measurement unit (IMU) incorporated in the HMD 14, and the position and the posture of the user U that are based on the positional information regarding the marker M identified by the three-dimensional measurement device 200, for instance. The detection results from the IMU are available irrespective of whether or not the positional information regarding the marker M has been identified in the three-dimensional measurement device 200, and thus, display of viewpoint images in the HMD 14, for instance, may be continued even during a period of time in which the positional information regarding the marker M is not identified due to accuracy as described above.

In a case where the combination $C_0$ changes into the combination $C_1$ (number of the images in which the marker M is detected≥threshold $i_{th}$) ((b) of FIG. 3) as a result of increase of the images in which the marker M is detected, subsequently, the image selection unit 210 selects the images, and the marker position identification unit 220 performs the identification of the positional information regarding the marker M with use of the selected images. The image selection unit 210, however, selects the images of the combination $C_1$ after the marker M has continuously been detected in the images of the combination $C_1$ for a specified time span, specifically, until a frame number j reaches a first threshold $j_{th1}$, and the marker position identification unit 220 performs the identification of the positional information at this point of time. Thus, a state in which selection of the images and the identification of the positional information are not performed may be maintained while the frame number j for which the marker M has continuously been detected in the images of the combination $C_1$ is smaller than the first threshold $j_{th1}$, so that falling of the number of the images in which the marker M is detected below the threshold $i_{th}$ in a short time span that may lead to an end of the identification of the positional information, resulting in unstable output of the positional information, may be prevented, for instance.

In a case where the combination $C_1$ changes into the combination $C_2$ (combination of images including the combination $C_1$) ((c) of FIG. 3) as a result of increase of the images in which the marker M is detected, the image selection unit 210 changes the combination of the images to be selected, from the combination $C_1$ to the combination $C_2$. The image selection unit 210, however, selects the images of the combination $C_2$ after the marker M has continuously been detected in the images of the combination $C_2$ for a specified time span, specifically, until the frame number j reaches a second threshold $j_{th2}$. Thus the selection of the images of the previous combination $C_1$ may be maintained while the frame number j for which the marker M has continuously been detected in the images of the combination $C_2$ is smaller than the second threshold $j_{th2}$, so that return of the combination $C_2$ to the combination $C_1$ in a short time span which may lead to rechange of the selected images, resulting in output of unstable positional information, may be prevented, for instance.

Here, the first threshold $j_{th1}$ and the second threshold $j_{th2}$ may be the same value or may be different values. In a case where the thresholds are different values, for instance, in a case where the identification of the positional information regarding the marker M is yet to be made by the marker position identification unit 220, the first threshold $j_{th1}$ may be made a relatively small value in order to acquire the positional information as soon as possible. In a case where the identification of the positional information regarding the marker M has already been made by the marker position identification unit 220 with the selection of the images of the combination $C_1$, the second threshold $j_{th2}$ may be made a relatively large value by attaching weight to stability of the output, so that $j_{th1} < j_{th2}$ may be attained.

In a case where the combination $C_2$ changes into the combination $C_3$ (combination of images included in the combination $C_2$, the number i of the images in which the marker M is detected≥threshold $i_{th}$) ((d) of FIG. 3) as a result of decrease of the images in which the marker M is detected, subsequently, the image selection unit 210 changes the combination of the images to be selected, from the combination $C_2$ to the combination $C_3$. In such case, selection of the images in which the marker M is not detected may not be continued, and thus, the image selection unit 210 changes the combination of the images to be selected, at a point of time when the marker M is detected in the combination $C_3$ of the images.

In a case where the combination $C_3$ changes into the combination $C_4$ (combination of images included in the combination $C_3$, the number i of the images in which the marker M is detected<threshold $i_{th}$) ((e) of FIG. 3) as a result of decrease of the images in which the marker M is detected, the image selection unit 210 ends the selection of the images. The marker position identification unit 220 thus ends the identification of the positional information regarding the marker M. In this case as well, the selection of the images in which the marker M is not detected may not be continued, and thus, the image selection unit 210 ends the selection of the images, at a point of time when the marker M is detected in the combination $C_4$ of the images.

Figure 4:
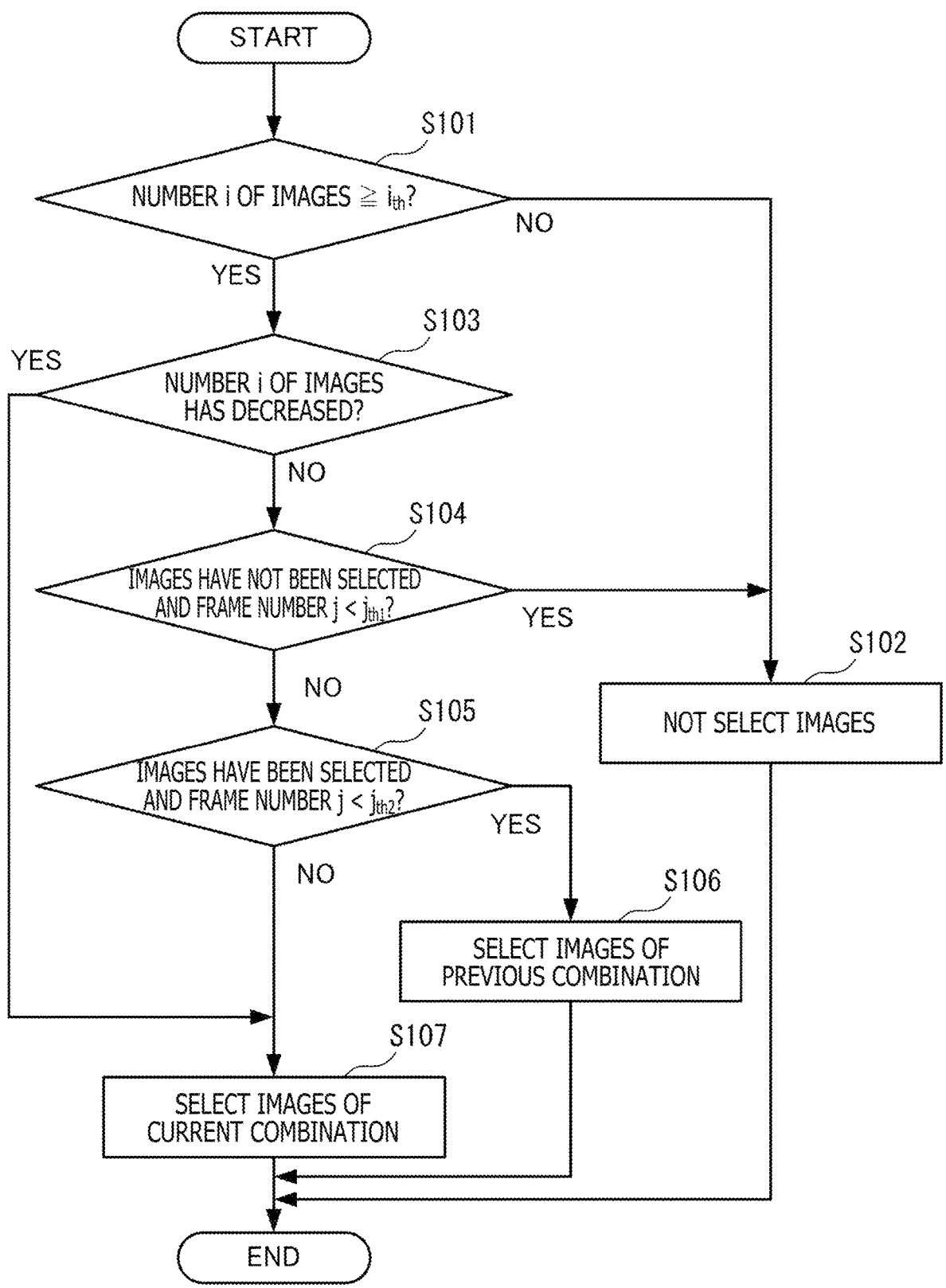
FIG. 4 is a flow chart regarding the example of the image selection process described with reference to FIG. 3.

FIG. 4 is a flow chart regarding the example of the image selection process described with reference to FIG. 3. In the illustrated example, first, the image selection unit 210 determines whether or not the number i of the images in which the marker M is detected is equal to or greater than the threshold $i_{th}$ (step S101). In a case where the number i of the images is smaller than the threshold $i_{th}$, the image selection unit 210 does not select the images (step S102). This process corresponds to examples of (a) and (e) of FIG. 3. In a case where the number i of the images is equal to or greater than the threshold $i_{th}$, by contrast, the image selection unit 210 determines whether or not the number i of the images in which the marker M is detected has decreased in comparison with the previous frame (step S103). In a case where the number i of the images has decreased, the image selection unit 210 selects the images of the current combination (step S107). This process corresponds to an example of (d) of FIG. 3.

In a case where the number i of the images is equal to or greater than the threshold $i_{th}$ and where the number i of the images has not decreased, by contrast, the image selection unit 210 determines whether or not images have not been selected in the previous frame and whether or not the frame number j for which the marker M has been continuously detected in the current combination of the images is smaller than the first threshold $j_{th1}$ (step S104). In a case where images have not been selected in the previous frame and where the frame number j is smaller than the threshold $j_{th1}$, the image selection unit 210 does not select images (step S102). This process corresponds to a process in a period for which images are not selected in the example of (b) of FIG. 3. The image selection unit 210 further determines whether or not images have been selected in the previous frame and whether or not the frame number j for which the marker M has continuously been detected in the current combination of the images is smaller than the second threshold $j_{th2}$ (step S105). In a case where images have been selected in the previous frame and where the frame number j is smaller than the threshold $j_{th2}$, the image selection unit 210 selects the images of the previous combination (step S106). This process corresponds to a process in a period for which the selection of the images of the combination $C_1$ is maintained in the example of (c) of FIG. 3.

In a case where both determinations in the above steps S104 and S105 are negative, the image selection unit 210 selects the images of the current combination (step S107). That is, in a case where it is determined in step S103 that the number i of the images has not decreased, the images of the current combination are selected in a case where images have not been selected in the previous frame and where the frame number j is equal to or greater than the threshold $j_{th1}$ and in a case where images have been selected in the previous frame and where the frame number j is equal to or greater than the threshold $j_{th2}$. The image selection unit 210 carries out such processes as described above for each frame, for instance, so that images are selected as illustrated in the example of FIG. 3.

(Example of Image Reselection Process)

Figure 5:
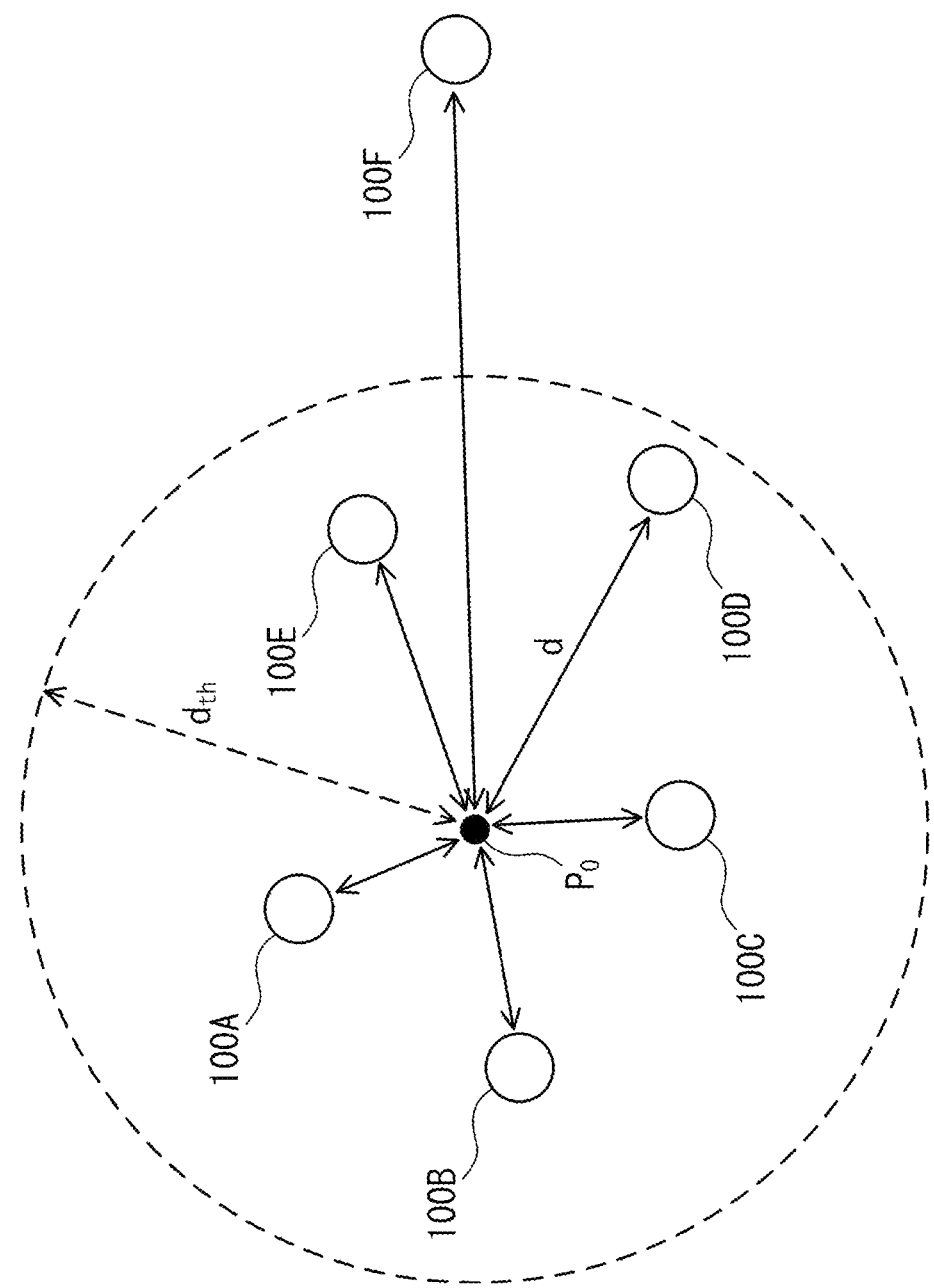
FIG. 5 is a diagram for description of an example of an image reselection process in the first embodiment of the present disclosure.

FIG. 5 is a diagram for description of an example of an image reselection process in the first embodiment of the present disclosure. As described above, the image reselection unit 230 of the three-dimensional measurement device 200 according to the present embodiment makes the reselection from the plural images selected by the image selection unit 210, on the basis of the relationships between the positional information regarding the marker M identified by the marker position identification unit 220 and the positional information regarding the plural cameras 100. In the illustrated example, the marker position identification unit 220 identifies a marker position $P_0$ with use of the plural images selected by the image selection unit 210. In such case, the image reselection unit 230 calculates a distance d from the identified marker position $P_0$ to each of cameras 100A through 100F on the basis of the marker position $P_0$ and positional information regarding the cameras 100A through 100F that is given in advance and reselects images captured by the cameras 100A through 100E whose distances d from the marker position $P_0$ are equal to or shorter than a specified threshold $d_{th}$. That is, in the illustrated example, the image reselection unit 230 reselects the images captured by the cameras positioned at distances equal to or shorter than the specified threshold $d_{th}$ from the marker position $P_0$ indicated by the identified positional information.

While accuracy in three-dimensional measurement is generally improved by use of more images, use of images captured by cameras whose distances to an object exceed a threshold may make no contribution to improvement in the accuracy on condition that a sufficient number of images are already used. In the above example, therefore, accuracy of the positional information regarding the marker M to be reidentified is improved by omission of the reselection of images captured by the camera 100F positioned at a distance exceeding the specified threshold $d_{th}$ from the marker position $P_0$, that is, by exclusion of the images captured by the camera 100F from images to be used for reidentification of the positional information regarding the marker M by the marker position identification unit 220. Note that the distance between the camera and the marker M may be estimated from a size of the marker M included in each of the images, for instance. Though the accuracy of the positional information regarding the marker M that is initially identified by the marker position identification unit 220 may be improved, the accuracy of the positional information is not low at all. Therefore, the distance between the camera and the marker M may be estimated more precisely with use of a result of the three-dimensional measurement as described above.

In the above example, as a result of the reidentification of the positional information regarding the marker M by the marker position identification unit 220 with use of the images reselected by the image reselection unit 230, there is a possibility for distances from a marker position $P_1$ indicated by the reidentified positional information to the cameras 100A through 100E that capture the reselected images to be different from the distances from the marker position $P_0$ to the cameras 100A through 100 E. In such a case, the image reselection unit 230 calculates the distance d from the marker position $P_1$ to each of the cameras 100A through 100E and reselects images captured by the cameras 100A through 100E whose distances d from the marker position $P_1$ are equal to or shorter than the specified threshold $d_{th}$. In a case where any image that is not reselected exists consequently, the marker position identification unit 220 reidentifies the positional information regarding the marker M with use of the images selected by a second round of the reselection. In a case where all the images have been reselected, by contrast, the positional information regarding the marker M last identified (or reidentified) by the marker position identification unit 220 at that point of time is stored as output in the buffer 240. Thus, the image reselection unit 230 may iterate the reselection of images until the distances d from the marker position P indicated by the reidentified positional information regarding the marker M to positions of all the cameras having captured the reselected images become equal to or shorter than the specified distance $d_{th}$.

Figure 6:
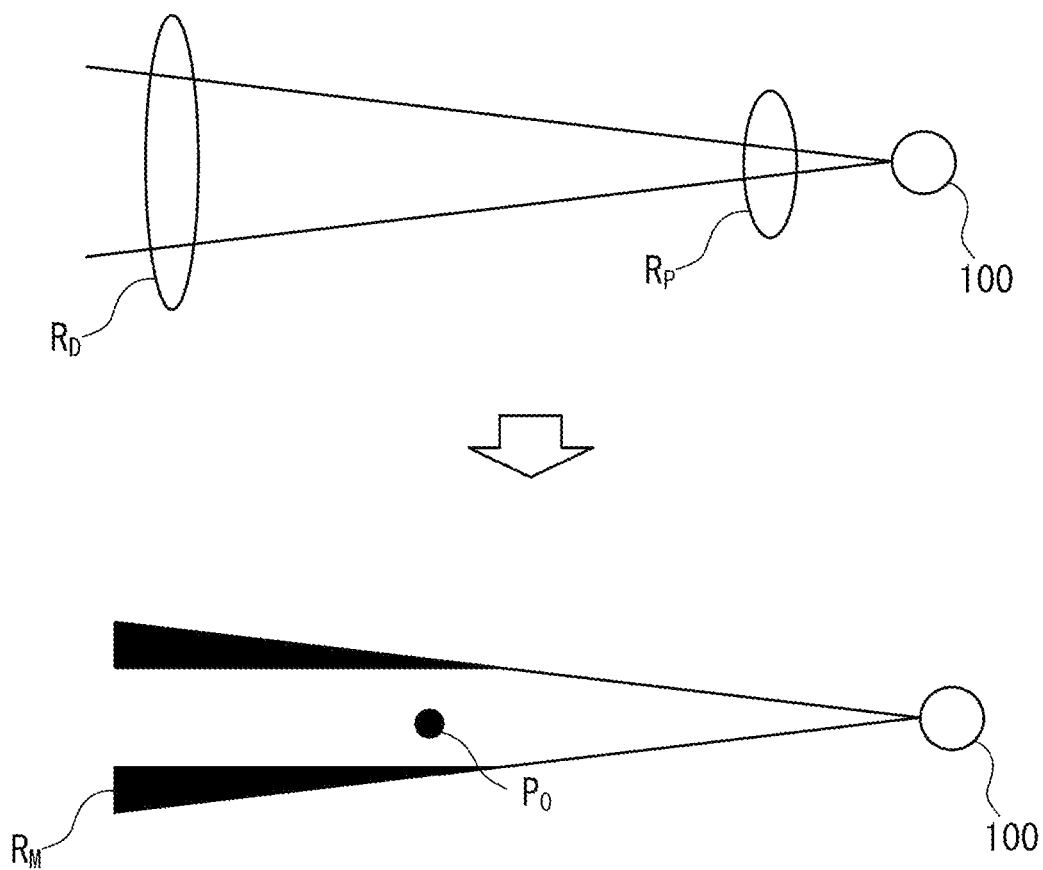
FIG. 6 is a diagram for description of another example of the image selection process in the first embodiment of the present disclosure.
Figure 7A:
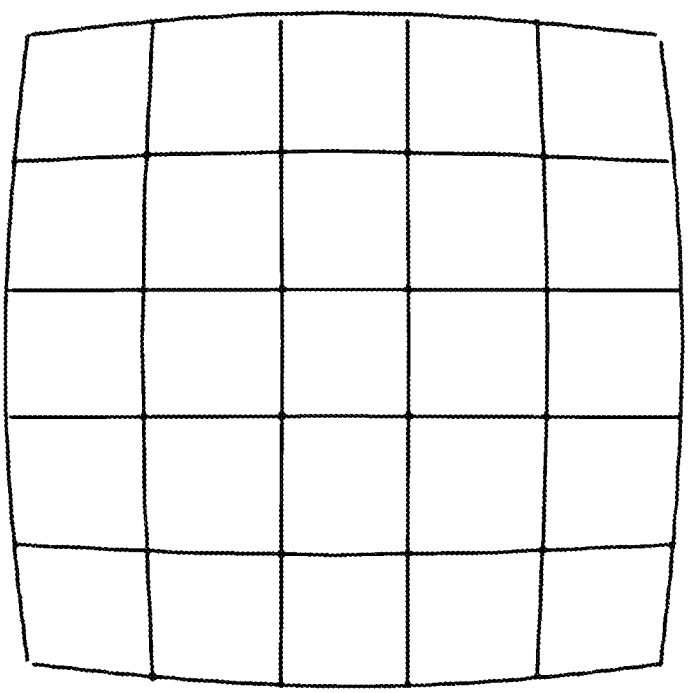
FIG. 7A is a diagram for description of yet another example of the image selection process in the first embodiment of the present disclosure.
Figure 7B:
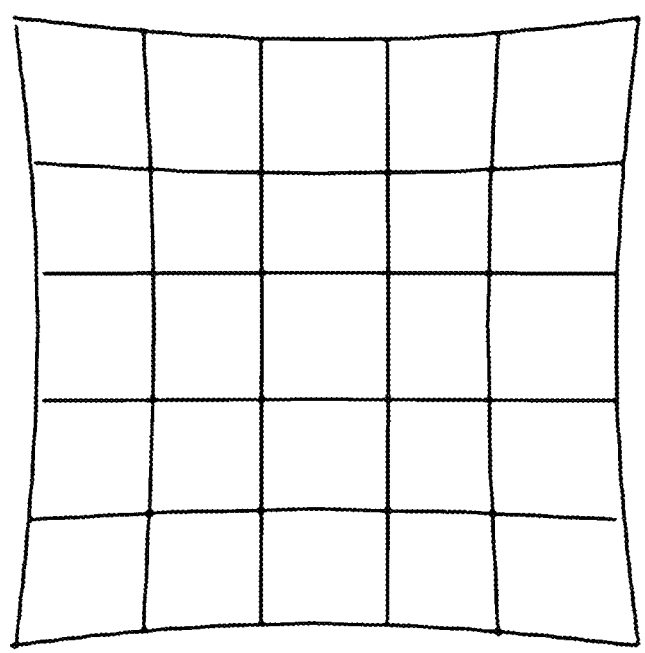
FIG. 7B is a diagram for description of still another example of the image selection process in the first embodiment of the present disclosure.

FIGS. 6, 7A, and 7B are diagrams for description of other examples of the image selection process in the first embodiment of the present disclosure. In the example described above with reference to FIG. 5, the image reselection unit 230 reselects the images according to the distances from the marker position $P_0$ to the plural cameras 100. In the example illustrated in FIG. 6, by contrast, the image reselection unit 230 reselects images captured by cameras by which the marker position $P_0$ may be captured in a region with small lens distortion. As illustrated in FIGS. 7A and 7B, such distortion as barrel distortion illustrated in FIG. 7A or pincushion distortion illustrated in FIG. 7B is generated in lenses of cameras. In those typical types of lens distortion, amount of distortion is smaller in a vicinity of center of the image but is larger in a vicinity of edges of the image. The distortion is compensated for in a stage of capturing image by the camera. In a case where images in which the marker M is captured in a region with large lens distortion are used for the three-dimensional measurement, however, it is possible that the accuracy in the measurement is not necessarily improved because an error due to compensation calculation occurs.

In the example illustrated in FIG. 6, therefore, a mask region $R_M$ corresponding to the region with large lens distortion is set, and images captured by cameras that cause the marker position $P_0$ to be excluded from the mask region $R_M$, that is, images captured by cameras that cause the marker position $P_0$ to be captured in the region with small lens distortion, are reselected. As illustrated in FIG. 6, influence of the lens distortion is made smaller in a region $R_P$ at a small distance from the lens but is made larger in a region RD at a large distance from the lens. Accordingly, the mask region $R_M$ is set in a region that is at large distances from the lens and that is near to edges of an angle of view. Such reselection of the images with use of the mask region $R_M$ as described above enables the identification of the positional information regarding the marker M with selective use of images that are less influenced by the error caused by the compensation calculation for the lens distortion as described above and improves the accuracy of the positional information.

In the above example of FIG. 6 as well, as with the example of FIG. 5, the image reselection unit 230 may iterate the reselection of the images until the reidentified marker position P is captured in the region with small lens distortion by all the cameras having captured the reselected images. The example of FIG. 5 and the example of FIG. 6 may be combined so that the image reselection unit 230 may reselect images on the basis of both the distances from the marker position P to the cameras and the mask region $R_M$ set corresponding to the lens distortion in each of the cameras.

Figure 8:
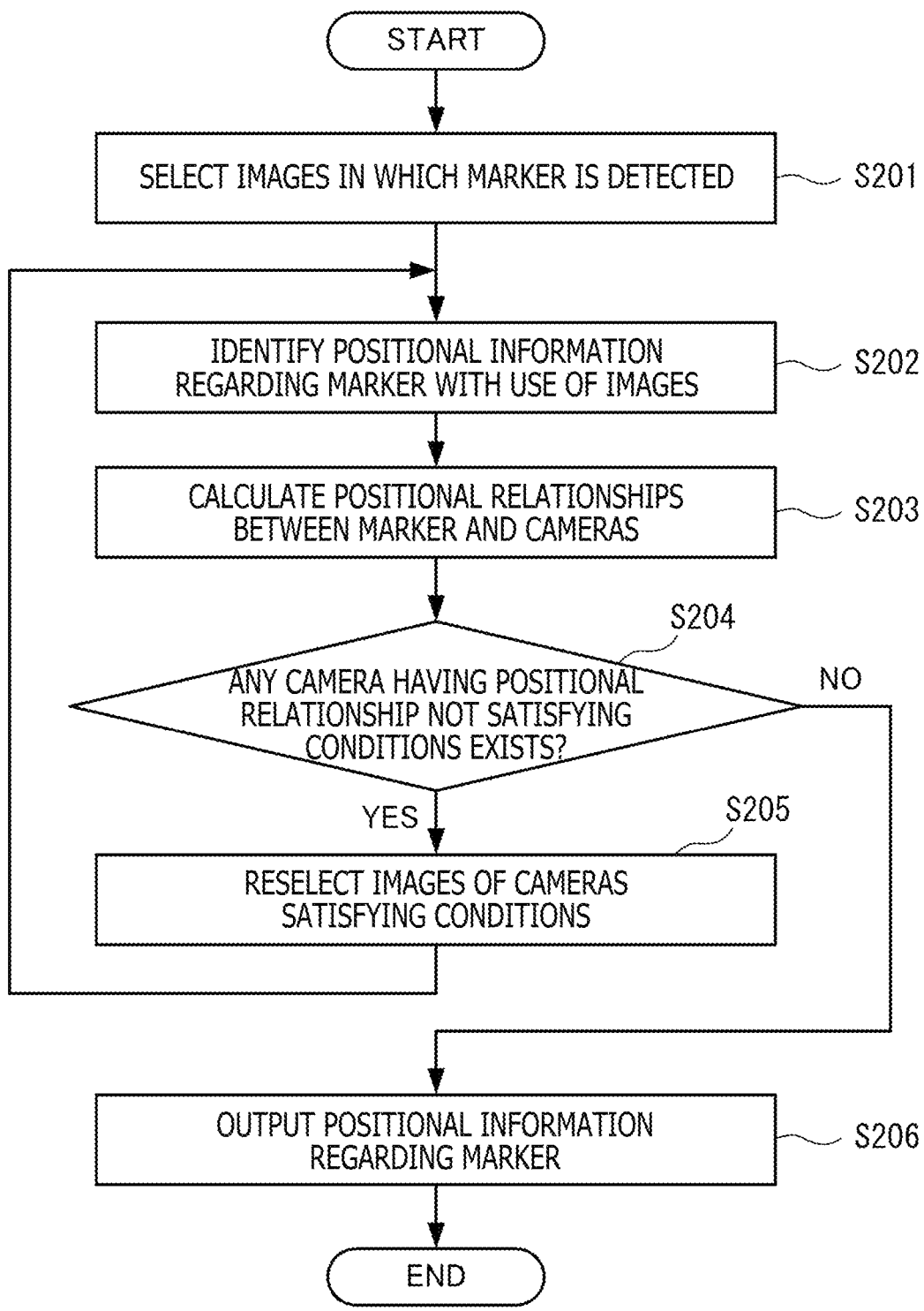
FIG. 8 is a flow chart regarding an example of an image reselection process described with reference to FIG. 6.

FIG. 8 is a flow chart regarding the example of the image reselection process described with reference to FIG. 6. In the illustrated example, first, the image selection unit 210 selects the images in which the marker M is detected (step S201), and the marker position identification unit 220 identifies the positional information regarding the marker M with use of the selected images (step S202). Subsequently, the image reselection unit 230 calculates the positional relationships between the marker M and the cameras 100 (step S203). Specifically, the image reselection unit 230 calculates the distances d from the identified marker position $P_0$ to the cameras 100 or determines whether or not the marker position $P_0$ is included in the mask regions $R_M$ for the cameras 100, as described above, for instance. In case where any camera 10 of which the positional relationship does not satisfy the conditions, specifically, whose distance d exceeds the threshold $d_{th}$ or with respect to which the marker position $P_0$ is included in the mask region $R_M$, exists (YES in step S204), the image reselection unit 230 reselects images captured by the cameras 100 that satisfy the conditions (step S205), and the marker position identification unit 220 identifies (reidentifies) the positional information regarding the marker M with use of the reselected images (step S202).

In a case where any camera 100 of which the positional relationship with the marker M does not satisfy the conditions does not exist in relation to the selected (or reselected) images (NO in step S204), that is, in a case where the image reselection unit 230 reselects all the images having been selected (or reselected) at that point of time, by contrast, the positional information regarding the marker M that has last been identified (or reidentified) by the marker position identification unit 220 at that point of time is outputted (step S206). Processes of steps S202 through S205 are iterated until the positional relationships between the marker position P and the cameras 100 satisfy the conditions in relation to all the selected (or reselected) images. Alternatively, an upper limit of number of times of iteration may be set. Such processes as described above enable improvement in the accuracy of the positional information with selective use of the images that make a contribution to the improvement in the accuracy of the three-dimensional measurement, from among the images in which the marker M is detected.

(Example of Buffer Process)

FIGS. 9A-9C depicts diagrams for description of an example of a buffer process in the first embodiment of the present disclosure. In the present embodiment, the images captured by the plural cameras 100 are updated at the specified time intervals (frame rate), and the marker position identification unit 220 identifies (reidentifies) the positional information regarding the marker M at the specified time intervals, as well. The positional information measured at the specified time intervals is stored in the buffer 240 in chronological order, and the output value generation unit 250 generates the output value of the positional information regarding the marker M, from the positional information stored in the buffer 240. The buffer 240 may be provided separately from a common buffer provided for transmission, output, or the like of data, for instance. In the example illustrated in FIGS. 9A-9C, positional information $v_t$ regarding the marker M identified by the marker position identification unit 220 from an image of each frame is stored in the buffer 240 having a size n. That is, positional information $v_k$ (k=t−n+1, t−n+2, . . . , t−1, t) for most recent n frames is stored in the buffer 240.

In a case where a number $m_1$ of pieces of information in the positional information $v_k$ stored in the buffer 240 which satisfy a condition that a difference $|diff|=|v^{OUT}_{t-1}-v_k|$ from most recent output value $v^{OUT}_{t-1}$ is equal to or smaller than a threshold $diff_{th}$ is equal to or greater than a first threshold $m_{th1}$ (FIG. 9A), for instance, the output value generation unit 250 may generate a latest output value $v^{OUT}_t$ with selective use of the positional information $v_k$ satisfying the above condition. More specifically, the output value generation unit 250 may set an average value of the positional information $v_k$ satisfying the condition, as the output value $v^{OUT}_t$, or may set a value estimated with use of a predictor such as Kalman filter from values of the positional information $v_k$ satisfying the condition, as the output value $v^{OUT}_t$, for instance.

In a case where a number $m_2$ of consecutive pieces of information in the positional information $v_k$ stored in the buffer 240 which do not satisfy the above condition, that is, of which the differences |diff| from the most recent output value $v^{OUT}_{t-1}$ exceed the threshold diff$_{th}$, is equal to or greater than a second threshold m$_{th2}$ (FIG. 9B), for instance, the output value generation unit 250 may generate the latest output value $v^{OUT}_t$ from the latest positional information $v_t$ and may further overwrite the entire buffer 240 with the latest positional information $v_t$ (FIG. 9C).

Based on the above-described determination with use of the first threshold m$_{th1}$ (FIG. 9A), precipitous values included in the positional information $v_k$, specifically, leap values that may be generated due to temporary change of the combination of the images to be used by the marker position identification unit 220 for the identification of the positional information, calculation error, or the like, for instance, may be removed, and the output value $v^{OUT}_t$ may be smoothed. Based on determination with use of the second threshold m$_{th2}$, on the other hand, the output value $v^{OUT}_t$ may be made to follow the positional information $v_k$ in a case of an actual and significant change in the positional information $v_k$ instead of generation of the leap values. Magnitude of the first threshold m$_{th1}$ and the second threshold m$_{th2}$ and priority between the determination with use of the first threshold m$_{th1}$ and the determination with use of the second threshold m$_{th2}$ may be determined according to which of stability and following performance of the output value $v^{OUT}_t$ is to be regarded as more important, for instance. In a case where the output value $v^{OUT}_t$ has not been generated based on either the determination with use of the first threshold m$_{th1}$ or the determination with use of the second threshold m$_{th2}$, output of the positional information regarding the marker M may be omitted as with the case where the image selection unit 210 does not select the images in the example described above, and the position and the posture of the user U may be calculated from the detection results of the acceleration, the angular velocity, and the like from the IMU incorporated in the HMD 14, for instance.

Figure 10:
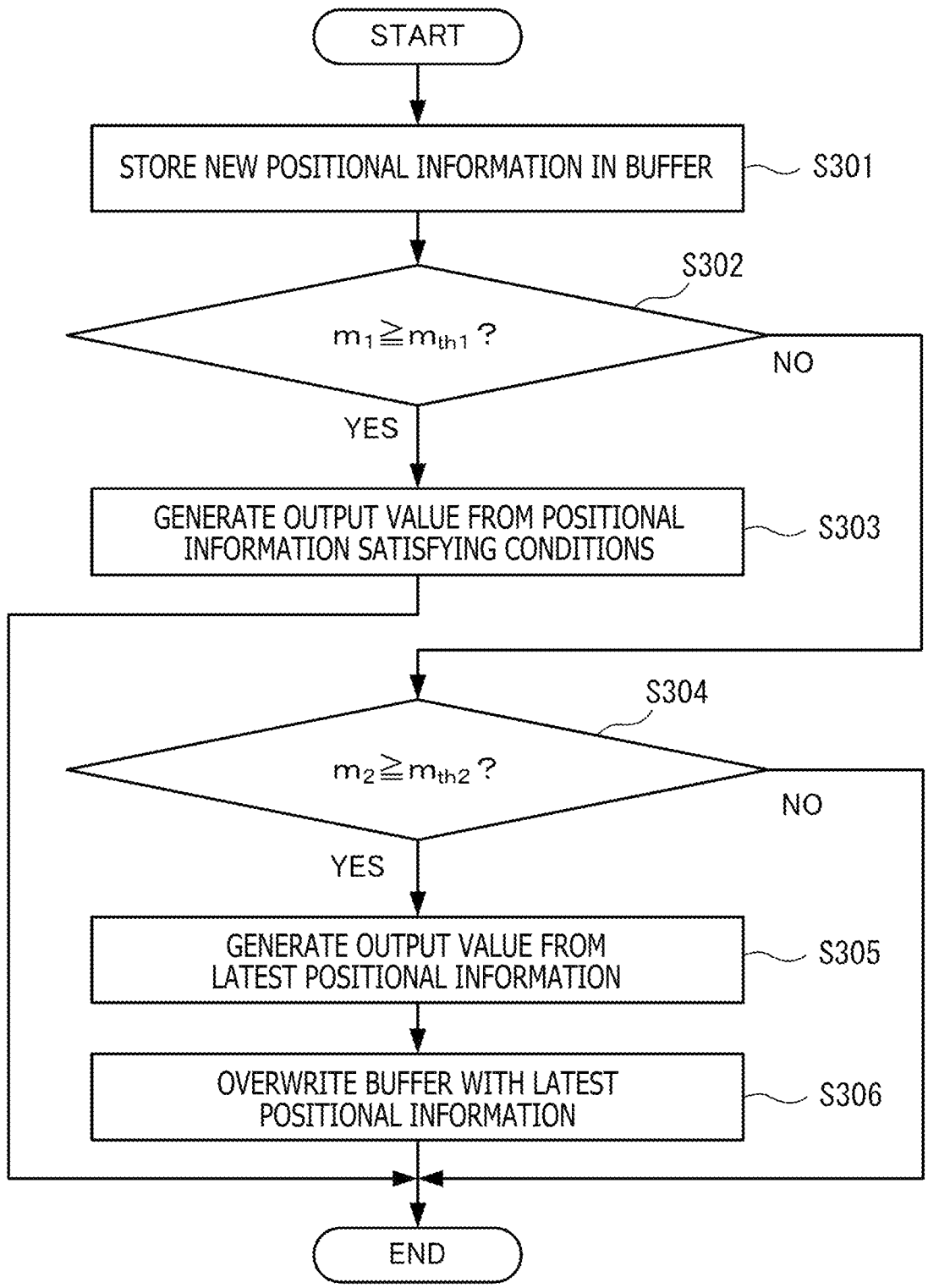
FIG. 10 is a flow chart regarding the example of the buffer process described with reference to FIGS. 9A-9C.

FIG. 10 is a flow chart regarding the example of the buffer process described with reference to FIGS. 9A-9C. In the illustrated example, first, the marker position identification unit 220 stores new positional information $v_t$ identified (or reidentified), in the buffer 240 (step S301). Subsequently, the output value generation unit 250 makes the determination with use of the first threshold m$_{th1}$, that is, the determination as to whether or not the number m$_1$ of the pieces of the positional information $v_k$ of which the differences |diff|=|$v^{OUT}_{t-1}$-$v_k$| from the most recent output value $v^{OUT}_{t-1}$ are equal to or smaller than the threshold diff$_{th}$ is equal to or greater than the first threshold m$_{th1}$ (step S302). In a case of m$_1 \geq$m$_{th1}$, the output value generation unit 250 generates the output value $v^{OUT}_t$ from the positional information $v_k$ that is stored in the buffer 240 and that satisfies the condition (step S303).

In a case of m$_1$<m$_{th1}$ in the determination in step S302, by contrast, the output value generation unit 250 makes the determination with use of the second threshold m$_{th2}$, that is, the determination as to whether or not the number m$_2$ of the consecutive pieces of information of which the differences |diff| from the most recent output value $v^{OUT}_{t-1}$ exceed the threshold diff$_{th}$ is equal to or greater than the second threshold m$_{th2}$ (step S304). In a case of m$_2 \geq$m$_{th2}$, the output value generation unit 250 generates the latest output value $v^{OUT}_t$ from the latest positional information $v_t$ (step S305) and overwrites the buffer 240 with the latest positional information $v_t$ (step S306). In a case of m$_2$<m$_{th2}$ in the determination in step S304, on the other hand, the output value generation unit 250 does not generate the output value $v^{OUT}_t$. Such processes as described above may enable improvement in the stability and the following performance of the output value $v^{OUT}_t$ with use of the buffer 240.

Note that order of the determination with use of the first threshold m$_{th1}$ and the determination with use of the second threshold m$_{th2}$ is not limited to the example illustrated in FIG. 10 and may be reversed, for instance. Alternatively, the output value $v^{OUT}_t$ may be inevitably generated without fail in a case where the positional information $v_t$ is identified, through making of only the determination with use of the first threshold m$_{th1}$ in step S302 and execution of the processes with use of the latest positional information $v_t$ (steps S305 and S306) in a case of m$_1$<m$_{th1}$, for instance.

Second Embodiment

Figure 11:
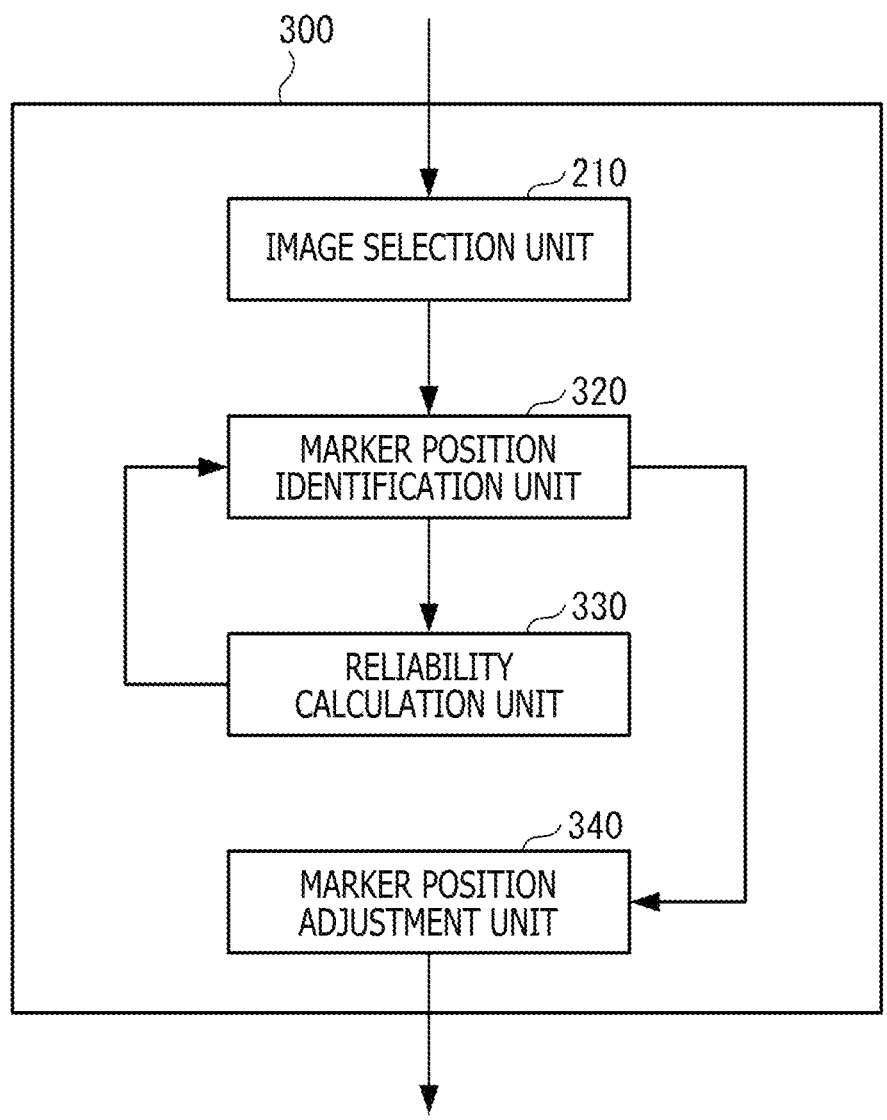
FIG. 11 is a block diagram illustrating a configuration of a three-dimensional measurement device according to a second embodiment of the present disclosure.

FIG. 11 is a block diagram illustrating a configuration of a three-dimensional measurement device according to a second embodiment of the present disclosure. In the illustrated example, a three-dimensional measurement device 300 includes the image selection unit 210, a marker position identification unit 320, a reliability calculation unit 330, and a marker position adjustment unit 340. The three-dimensional measurement device 300 is implemented by a computer including a communication interface, a processor, and a memory, and functions of the image selection unit 210, the marker position identification unit 320, the reliability calculation unit 330, and the marker position adjustment unit 340 are fulfilled by operation of the processor in accordance with a program stored in the memory or received through the communication interface, for instance. Note that a configuration of a system including the three-dimensional measurement device 300 and a configuration of the image selection unit 210 are similar to those of the above first embodiment, and thus, redundant description of the configurations is omitted.

The marker position identification unit 320 identifies positional information regarding the marker M in the three-dimensional space SP with use of plural images selected by the image selection unit 210. A method by the marker position identification unit 320 of identifying the positional information, specifically, such as three-dimensional coordinates, regarding the marker M upon the principle of triangulation is already known, and thus, detailed description of the method is omitted. In the present embodiment, the marker position identification unit 320 identifies the positional information regarding the marker M with use of all of the images selected by the image selection unit 210 and additionally reidentifies the positional information regarding the marker M for each group of images set according to reliability of each combination of cameras or images that is calculated by the reliability calculation unit 330 as will be described later.

Figure 12:
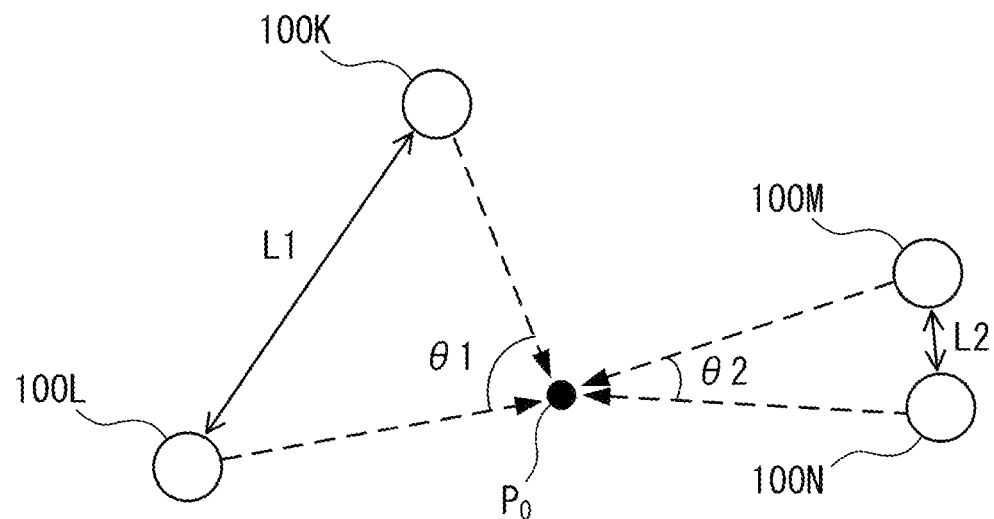
FIG. 12 is a diagram for description of calculation of reliability in the second embodiment of the present disclosure.

The reliability calculation unit 330 calculates reliability r of results of three-dimensional measurement for a combination of plural images selected by the image selection unit 210. FIG. 12 is a diagram for description of a method of calculating the reliability r. In the illustrated example, cameras 100K through 100N that have captured images in which the marker M is detected are illustrated. For a combination of the camera 100K and the camera 100L, for instance, an angle θ1 between straight lines extending from the cameras toward the marker position P$_0$ and a distance L1 between the cameras may be defined. For a combination of the camera 100M and the camera 100N, similarly, an angle θ2 between straight lines extending from the cameras toward the marker position P$_0$ and a distance L2 between the cameras may be defined. In regard to the above angles, a relation of 0°≤θ1, θ2≤180° holds. In this case, reliability r1 and reliability r2 of the combinations of the cameras or combinations of images captured by the cameras are calculated as in expression (1) below, for instance.

[Math. 1]

$$r1 = \frac{\alpha \sin\theta 1 + \beta \cdot \left(1 - \frac{L1}{L_{max}}\right)}{\alpha + \beta}, r2 = \frac{\alpha \sin\theta 2 + \beta \cdot \left(1 - \frac{L2}{L_{max}}\right)}{\alpha + \beta} \quad (1)$$

In expression (1), $L_{max}$ is a maximum value of the distance in each combination of the cameras and α and β, are weighting coefficients for conditions of the angle and the distance, respectively. Expression (1) means that increase in the reliability is caused by increase in proximity of the angle between the straight lines extending from the cameras toward the marker position $P_0$ to 90° and by increase in the distance between the cameras. As for the reliability r1 of the combination of the cameras 100K and 100L and the reliability r2 of the combination of the cameras 100M and 100N in the example of FIG. 12, therefore, r1>r2 holds. The reliability calculation unit 330 calculates such reliability as described above for every combination of a specified number of images extracted from the plural images selected by the image selection unit 210 (the number of the combinations is $_xC_y$ in a case where y images are extracted from x images, for instance.). In the example illustrated in FIG. 11, therefore, the reliability is also calculated for a combination of the camera 100K and the camera 100M or 100N and a combination of the camera 100L and the camera 100M or 100N.

Figure 13:
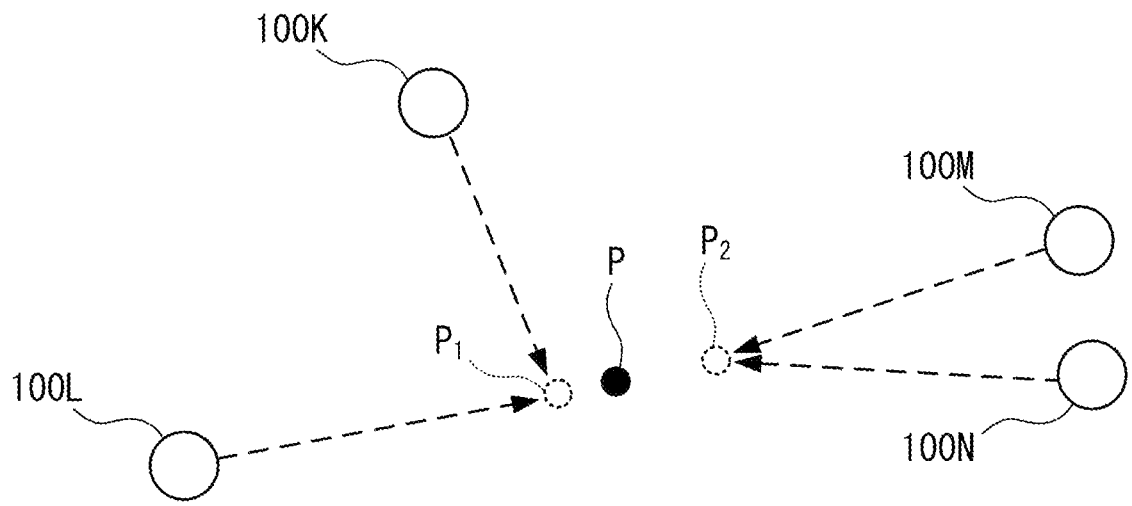
FIG. 13 is a diagram for description of adjustment of positional information based on the reliability described with reference to FIG. 12.

Referring again to FIG. 11, the marker position adjustment unit 340 adjusts the positional information regarding the marker M that is to be finally outputted, with use of the positional information regarding the marker M reidentified by the marker position identification unit 320, for each group of images set according to the reliability calculated by the reliability calculation unit 330. More specifically, when a final marker position P is to be determined by integration of the marker position $P_1$ identified from the combination of cameras or images having relatively high reliability (combination of the camera 100K and the camera 100L) and the marker position $P_2$ identified from the combination of cameras or images having relatively low reliability (combination of the camera 100M and the camera 100N) as illustrated in FIG. 13, for instance, the marker position adjustment unit 340 carries out integration of the positional information in proportion to degree of the reliability. That is, in a case where the three-dimensional coordinates of the marker position $P_1$ are (x1, y1, z1) and where the three-dimensional coordinates of the marker position $P_2$ are (x2, y2, z2), the three-dimensional coordinates of the marker position P (x, y, z) are determined as in expression (2) below.

[Math. 2]

$$(x, y, z) = \left(\frac{r1x1 + r2x2}{r1 + r2}, \frac{r1y1 + r2y2}{r1 + r2}, \frac{r1z1 + r2z2}{r1 + r2}\right) \quad (2)$$

According to the configuration of the second embodiment of the present disclosure as described above, the accuracy of the positional information may further be improved by weighted integration of calculation results of the positional information according to the reliability defined among the cameras or among the images while the accuracy in the three-dimensional measurement of the marker M is ensured by use of more images.

Though the several embodiments of the present disclosure have been described above in detail with reference to the accompanying drawings, the present disclosure is not limited to the examples. It is apparent that those who have common knowledge in the field of the art to which the present disclosure belongs may conceive of various alterations or modifications within the scope of technical ideas disclosed in the claims, and it is to be understood that the alterations and the modifications naturally fall within the technical scope of the present disclosure.

What is claimed is:

1. A three-dimensional measurement device comprising:
    an image selection unit that selects plural images in which a marker is detected, from among images captured by plural cameras placed at different positions in a three-dimensional space where the marker exists;
    a marker position identification unit that identifies positional information regarding the marker in the three-dimensional space with use of the plural images; and
    an image reselection unit that reselects some of the plural images, on a basis of relationships between the positional information identified by the marker position identification unit and positional information regarding the plural cameras,
    wherein the marker position identification unit reidentifies the positional information with use of the reselected images.

2. The three-dimensional measurement device according to claim 1,
    wherein the image reselection unit makes a reselection of images captured by cameras positioned at distances equal to or shorter than a specified distance from a position of the marker indicated by the identified positional information.

3. The three-dimensional measurement device according to claim 2,
    wherein the image reselection unit iterates the reselection until distances from a position of the marker indicated by the reidentified positional information to positions of all cameras having captured the reselected images become equal to or shorter than the specified distance.

4. The three-dimensional measurement device according to claim 1,
    wherein the image reselection unit makes a reselection of images captured by cameras that cause a position of the marker indicated by the identified positional information to be captured in a region with lens distortion less than a predetermined threshold.

5. The three-dimensional measurement device according to claim 4,
    wherein the image reselection unit iterates the reselection until a position of the marker indicated by the reidentified positional information is captured in the region with lens distortion less than the predetermined threshold by all cameras having captured the reselected images.

6. The three-dimensional measurement device according to claim 1,
    wherein the image selection unit does not select the plural images in a case where the number of the images in which the marker is detected is smaller than a specified threshold, and the marker position identification unit does not identify the positional information in a case where the plural images are not selected.

7. The three-dimensional measurement device according to claim 1,
wherein the images captured by the plural cameras are updated at specified time intervals, and
after a combination of the images in which the marker is detected has been changed from a first combination to a second combination including the first combination and after the marker has continuously been detected in images of the second combination for a specified time span, the image selection unit selects the images of the second combination.

8. The three-dimensional measurement device according to claim 1,
wherein the images captured by the plural cameras are updated at specified time intervals, and
the three-dimensional measurement device further includes
a buffer in which the reidentified positional information is stored at specified time intervals and in chronological order, and
an output value generation unit that generates a latest output value with selective use of positional information of which differences from a most recent output value are equal to or smaller than a specified threshold, in the positional information stored in the buffer.

9. The three-dimensional measurement device according to claim 8,
wherein, in a case where pieces of the positional information of which the differences from the most recent output value exceed the specified threshold have continuously been stored in the buffer, in a number equal to or greater than a specified number, the output value generation unit generates a latest output value from the positional information that is latest and further overwrites entirety of the buffer with the latest positional information.

10. A three-dimensional measurement method comprising:
selecting plural images in which a marker is detected, from among images captured by plural cameras placed at different positions in a three-dimensional space where the marker exists;
identifying positional information regarding the marker in the three-dimensional space with use of the plural images;
reselecting some of the plural images, on a basis of relationships between the identified positional information and positional information regarding the plural cameras; and
reidentifying the positional information with use of the reselected images.

11. A non-transitory computer readable medium having stored thereon a program for a computer, the program comprising:
by an image selection unit, selecting plural images in which a marker is detected, from among images captured by plural cameras placed at different positions in a three-dimensional space where the marker exists;
by a marker position identification unit, identifying positional information regarding the marker in the three-dimensional space with use of the plural images;
by an image reselection unit, reselecting some of the plural images, on a basis of relationships between the identified positional information and positional information regarding the plural cameras; and
by the marker position identification unit, reidentifying the positional information with use of the reselected images.

\* \* \* \* \*